UNITED STATES PATENT OFFICE.

JALMAR G. NATHURST, OF KINGSTON, NEW YORK.

TRINITROTOLUENE MIXTURE FOR EXPLOSIVES.

971,211. Specification of Letters Patent. Patented Sept. 27, 1910.

No Drawing. Original application filed December 7, 1909, Serial No. 531,901. Divided and this application filed February 8, 1910. Serial No. 542,812.

*To all whom it may concern:*

Be it known that I, JALMAR G. NATHURST, a citizen of the United States, residing at Kingston, in the county of Ulster and State of New York, have invented certain new and useful Improvements in Trinitrotoluene Mixtures for Explosives; and I do hereby declare the following to be a full, clear, and exact description of the invention, such as will enable others skilled in the art to which it appertains to make and use the same.

This invention relates to non-volatile compounds especially adapted for use in connection with high explosives such as are described and claimed in my application Number 531,901, filed December 7, 1909, of which this is a division; and it has for its object to produce a product of this nature which will be highly endothermic when being made, and also one that when mixed with a high explosive, on detonation will give off little or no noxious fumes; all as will be more fully disclosed hereinafter and particularly pointed out in the claims.

It is well known that compounds of the natures of mononitrobenzole and of the solid and liquid nitrotoluenes have been used with nitroglycerin in order to lower the freezing point of the latter; but these compounds are poisonous, the liquid ones are volatile, they oxidize with difficulty, and they produce noxious fumes in detonation, all of which qualities render them more or less unsuitable for extended practical use. I have discovered, however, that by treating liquid dinitrotoluene of commerce with a suitable mixture such for example, as a mixture of concentrated nitric and sulfuric acids, a compound is obtained which, when mixed with nitroglycerin and a suitable deterrent or dope to be described below, produces a high explosive having a low freezing point as well as other desirable qualities to be described, and which on detonation does not produce noxious fumes to any appreciable extent. This compound is also highly endothermic and, therefore, acts as an accelerator and adds to the strength of the explosive.

The compound is preferably produced as follows:—To 100 parts of an acid mixture consisting of about 3 per cent. water, 36 per cent. concentrated nitric acid ($HNO_3$) and about 61 per cent. of concentrated sulfuric acid ($H_2SO_4$), I add, while constantly stirring the same, about 90 parts of commercial liquid dinitrotoluene or liquid trinitrotoluene not allowing the temperature to rise above 90° F. The whole may then be run into a large quantity of cold water, whereupon the product formed will sink to the bottom, and may be drawn off and washed until entirely free of acid. The product, however, could be left in the acid mixture until it separates out and the spent acids thus recovered. This nitrated product is non-volatile, and does not give off noxious or poisonous gases and is easily oxidized when mixed with nitroglycerin and the latter is detonated.

The washing is preferably done in first cold and then hot water at preferably about 80° C. and finally in a five per cent. solution of ammonia. The finished compound is a liquid below 50° F., is of a brick red color having a specific gravity of about 1.5 at 60° F., and is an isomer of trinitrotoluene mixed with a small quantity of dinitrotoluene as an impurity. The amount of dinitrotoluene which exists in this compound varies, and it sometimes may amount to 10 or 15 per cent. or even higher.

Liquid nitrotoluenes which are used with nitroglycerin in explosives, in order to lower the freezing point of the latter, have the disadvantage of being volatile, as above stated, and also have a smell of bitter almonds which is even noticeable in the fumes from the detonation of the explosive containing the same. This goes to show that these nitrotoluene substances are incompletely oxidized on detonation. I have found that by treating liquid dinitrotoluene in the manner above described, that a product is obtained which has no smell and which when used with nitroglycerin in explosives is completely oxidized, thus giving off no noxious fumes.

The restraining agent or dope above mentioned which is to be also mixed with the above nitrated compound consists of sulfur, nitrate of sodium, wood or other pulp, and antacid consisting of a carbonate of sodium, for example, or a suitable alkali, in substantially the proportions below mentioned.

The following is given as a specific example of the use of my new compound in high explosives,—supposing it is desired to obtain the same disruptive strength as the ordinary 40 per cent. nitroglycerin dynamite, and one that will not freeze at say—28° C.; even when exposed for a long time. I take of nitroglycerin 28 per cent., nitrocellulose 1 per cent., the above nitrated compound 4 per cent., and to this mixture I add a deterrent consisting of sulfur 2 per cent., of nitrate of sodium 63 per cent., of wood or other pulp 1½ per cent. and of antacid or alkali ½ per cent.

The gelatin explosive thus produced is characterized by the following properties:— It does not readily freeze above —28° C., it does not give off any appreciable amount of noxious fumes or gases when detonated, it does not creep or exude from the package to any appreciable extent while shipping, it is substantially non-volatile, its danger of exploding on thawing is greatly reduced, and it is less susceptible to concussion and shock than other explosives of like nature. It requires a higher temperature to ignite, and it can be used with safety at low temperatures and in confined spaces, such as mines.

The proportions above given are those I prefer to use but, of course, they may be varied within wide limits without completely destroying the utility of my compound or explosive. In fact 20 parts of nitroglycerin have sufficient available oxygen to completely oxidize one part of my nitrotoluene compound and in practice I have found that a mixture of equal parts of these two constituents will detonate when a detonator containing ten grain of fulminating mercury is employed.

What I claim is:—

1. The process of producing a compound for use in high explosives which consists in subjecting commercial liquid dinitrotoluene to the action of concentrated nitric and sulfuric acids while stirring the same; preventing the temperature from rising above 90° F.; in suitably separating the product thus obtained from the said acids, and in finally suitably washing the same, substantially as described.

2. The herein described compound comprising an isomer of trinitrotoluene, having a brick red color, a specific gravity of 1.50 at 60° F., melting below 50° F., and being non-volatile and substantially odorless, substantially as described.

3. The herein described product consisting of an isomer of tri-nitrotoluene mixed with dinitrotoluene, having a brick red color, a specific gravity of about 1.50 at 60° F. and being a liquid below 50° F., non-volatile and substantially odorless, substantially as described.

In testimony whereof, I affix my signature, in presence of two witnesses.

JALMAR G. NATHURST.

Witnesses:
    WM. CORKBURN,
    LOUIS B. SAUTER.